United States Patent [19]

Brauer, Jr. et al.

[11] Patent Number: 5,055,311
[45] Date of Patent: Oct. 8, 1991

[54] DISPOSABLE COFFEE-BREWING APPARATUS

[75] Inventors: Walter, H. Brauer, Jr., 160 Beech Street, Roslindale, Mass. 02131; Martha A. Seely, Somerville, bothof, Mass.; Ramie L. Friedman, Randolph, all of Mass.

[73] Assignee: Walter H. Braier, Jr., Roslindale, Mass.

[21] Appl. No.: 436,478

[22] Filed: Nov. 14, 1989

Related U.S. Application Data

[63] Continuation-in-part of Ser. No. 159,839, Feb. 24, 1988, abandoned.

[51] Int. Cl.5 .......................... A47J 31/00; B65B 29/02
[52] U.S. Cl. ...................................... 426/82; 426/112; 426/77; 99/295; 99/304; 99/306; 210/497.3; 248/152; 248/174
[58] Field of Search ......................... 99/306, 304, 295; 426/77-84, 112, 433, 435; 210/497.3; 248/152,174

[56] References Cited

U.S. PATENT DOCUMENTS

| | | |
|---|---|---|
| 1,876,474 | 9/1932 | Starkey . |
| 1,953,291 | 4/1934 | De Vry ................................. 53/3 |
| 2,576,332 | 11/1951 | Derck ............................. 210/163.5 |
| 2,727,633 | 12/1955 | Nickerson ........................... 210/149 |
| 2,835,191 | 5/1958 | Clurman ............................... 99/322 |
| 3,086,447 | 4/1963 | Arnett et al. ........................ 99/295 |
| 3,334,574 | 8/1967 | Douglas ............................... 99/304 |
| 3,344,734 | 10/1967 | Aguirre-Batres et al. ............ 99/304 |
| 3,361,052 | 1/1968 | Weber ................................. 99/299 |
| 3,615,708 | 10/1971 | Abile-Gal .......................... 99/171 P |
| 3,695,167 | 10/1972 | Schmidt et al. ...................... 99/306 |
| 3,935,318 | 1/1976 | Milailide ............................. 426/80 |
| 3,975,996 | 8/1976 | Vitous ................................. 99/295 |
| 3,985,069 | 10/1976 | Cavalluzzi ........................... 99/295 |
| 4,025,435 | 5/1977 | Shea ................................. 210/250 |
| 4,069,751 | 1/1978 | Gronwick et al. .................... 99/306 |
| 4,158,329 | 6/1979 | McKnight ............................ 99/295 |
| 4,167,899 | 9/1979 | McCormick ...................... 99/302 R |
| 4,286,136 | 8/1981 | Mason, Jr. .................... 219/10.55 E |
| 4,338,338 | 7/1982 | Popkes ................................. 426/82 |
| 4,382,861 | 5/1983 | Adeboi et al. .................... 210/497.2 |
| 4,429,623 | 2/1984 | Illy ..................................... 99/295 |
| 4,446,158 | 5/1984 | English et al. ....................... 426/79 |
| 4,506,597 | 3/1985 | Karns et al. ......................... 99/295 |
| 4,519,911 | 5/1985 | Shimizu ............................. 210/478 |
| 4,560,475 | 12/1985 | Kataoka ............................ 210/249 |
| 4,577,080 | 3/1986 | Grossman .................... 219/10.55 E |
| 4,584,101 | 4/1986 | Kataoka ............................ 210/474 |
| 4,715,271 | 12/1987 | Kitagawa ............................ 99/306 |

FOREIGN PATENT DOCUMENTS

| | | |
|---|---|---|
| 1947146 | 12/1971 | Fed. Rep. of Germany . |
| 2131124 | 1/1973 | Fed. Rep. of Germany . |
| 2235214 | 1/1974 | Fed. Rep. of Germany . |
| 2738969 | 3/1979 | Fed. Rep. of Germany . |
| 2479674 | 10/1981 | France . |
| WO83/00611 | 3/1983 | World Int. Prop. O. . |

Primary Examiner—Steven Weinstein
Attorney, Agent, or Firm—Weingarten, Schurgin, Gagnebin & Hayes

[57] ABSTRACT

A disposable coffee-brewing apparatus comprising a collapsible and expandable housing for supporting a filter element containing ground coffee. In its collapsed configuration the housing forms a flat parcel which can be provided with detachable sealing tabs or can be packaged in a separately sealed envelope. In its expanded configuration, the housing forms a generally tubular structure for placement around a drinking cup or other receptacle such that the coffee-brewing apparatus surrounds or substantially surrounds the receptacle and is situated on the same surface which supports the drinking receptacle. The expanded housing supports a filter element directly over the drinking receptacle such that hot water can be poured into the filter element, passing through coffee grounds therein and into the receptacle below to create a cup of fresh brewed coffee. After dispensing the coffee beverage, the housing can be collapsed once again and the coffee-brewing apparatus discarded.

12 Claims, 6 Drawing Sheets

DISPOSABLE COFFEE-BREWING APPARATUS

RELATED APPLICATION

The present application is a continuation-in-part of application Ser. No. 07/159,839 filed on Feb. 24, 1988, now abandoned.

FIELD OF THE INVENTION

The present invention relates generally to coffee makers and more specifically to a disposable apparatus for brewing a single cup of fresh coffee.

BACKGROUND OF THE INVENTION

The public demand for the genuine taste of fresh brewed coffee speaks for itself. This demand has resulted in the widespread purchase and use of gravity-drip coffee-makers such that these devices have become common household appliances. However, a residual demand exists for a disposable coffee-brewing apparatus adapted for the preparation of a single cup of coffee.

Typical gravity-drip coffee-makers involve a disposable filter element mounted in some type of reusable basket-shaped housing for retaining a measured amount of coffee grounds. This housing/filter combination is suspended above a receptacle in a frame so that the filter/grounds combination can receive water poured therethrough and dispense a coffee beverage. Such coffee-makers can also include an integral electric water heating and dispensing unit. A variation on this scheme provides a rigid filter frame for mounting directly on a receptacle, avoiding the necessity for a seperate frame for suspending the filter basket.

Although the gravity-drip brewing method is well known and generally well accepted, existing devices are not well adapted to producing a single serving of fresh coffee. When a single serving of coffee grounds is placed in the basket of a conventional drip coffee maker, the water being filtered therethrough passes through such a thin layer of coffee grounds, the resulting cup of coffee is very weak. Furthermore, the inconvenience of measuring ground coffee and cleaning up used coffee grounds for a single serving can present a significant deterrent for coffee drinkers who are willing to accept a lower quality beverage by turning to the ease and convenience of instant coffee rather than be bothered by brewing a single cup of fresh coffee.

Coffee-brewing devices known in the art have recognized the desirability of providing a single cup of fresh brewed coffee by means of a disposable brewing apparatus. The present art in disposable coffee-brewing apparatus disclose devices which are mounted directly on a receiving receptacle, as for example in U.S. Pat. Nos. 3,615,708 and 4,715,271. As a result, the present art requires the use of a receptacle having a predetermined diameter corresponding to the diameter of the coffee-brewing apparatus or must rely on a support apparatus having a variable dimension which is interactive with the receptacle for supporting the coffee-maker thereon, as disclosed in U.S. Pat. Nos. 4,560,475 or 4,715,271. Such systems are very unstable and highly susceptible to tipping due to the force of the water being poured into the filter. Thus, it is desirable to provide a disposable coffee-brewing apparatus for positioning over a receptacle such that the support housing thereof is independently supported on the same surface which supports the receptacle.

SUMMARY OF THE INVENTION

The present invention discloses a disposable coffee-brewing apparatus for placement over a drinking receptacle such that the apparatus surrounds or substantially surrounds the receptacle, positioned on the surface supporting the drinking receptacle. The present coffee-brewing apparatus comprises an expandable and collapsible housing for supporting a filter element. In its collapsed configuration, the support housing forms a flat parcel for packaging and storage. The housing is fabricated from a plyable material such that the flat parcel can be expanded to form a generally tubular frame, sufficiently rigid to support a filter element provided with a measure of ground coffee and at least approximately one cup of hot water.

The coffee-brewing apparatus of the present invention is prepared for use by forming the collapsed housing into its expanded configuration and then positioned over a drinking receptacle. In one embodiment of the present invention the housing is provided with an integral filter element attached to the support housing around its circumference. In a second embodiment, the support housing is provided with a self-contained filter basket into which a separate filter element and grounds can be placed. In order to make a cup of fresh coffee, the user simply positions the coffee-brewing apparatus over a drinking receptacle and pours a measure of hot water through the filter/coffee combination.

The coffee-brewing apparatus presently disclosed can be provided with a predetermined amount of fresh ground coffee to form a completely self-contained coffee maker. Such self-contained apparatus is sealed in its collapsed configuration along the filter element opening or sealed along both open ends thereof. Alternatively, the apparatus can be sealed in a separate packaging envelope. The fact that each disposable coffee-brewing apparatus can be individually packaged results in a further advantage in that the apparatus of the present invention can be marketed with various coffee flavors or like brewing substances to meet the varying tastes of the consuming public.

As an added feature, the coffee-brewing apparatus of the present invention is easily disposable. The apparatus is lightweight and inexpensive. Once the water has passed through the coffee grounds, the cup of coffee is brewed, and the brewing apparatus can simply be folded back to its collapsed shape and tossed in the trash.

Thus, the present invention provides a simple and convenient means for efficiently producing a single cup of quality, fresh-brewed, ground coffee. Convenience is provided by way of an apparatus which is easy to store prior to use and readily disposable after use, while simplicity is the result of a neat and trouble-free design for actual use.

DESCRIPTION OF THE DRAWINGS

Other features and advantages of the invention will be apparent from the following description in conjunction with the accompanying drawings wherein.

DETAILED DESCRIPTION OF THE INVENTION

Figure 1:
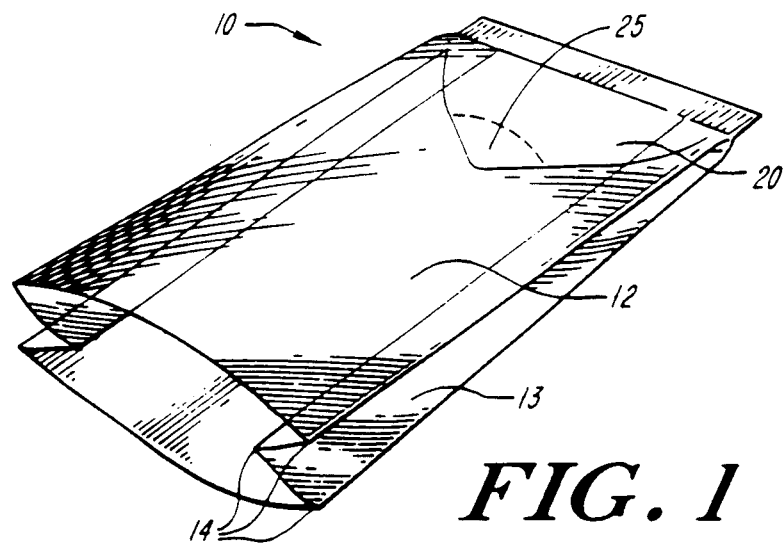
FIG. 1 is a perspective view of a first embodiment of the present invention in its collapsed configuration.

Referring now to the accompanying drawings, in which similar reference characters identify similar parts in different embodiments of the invention, the disposable coffee-brewing apparatus of the present invention is generally designated by the reference numeral 10, comprising a housing 12 and a filter element 20 for support thereon.

Figure 2:
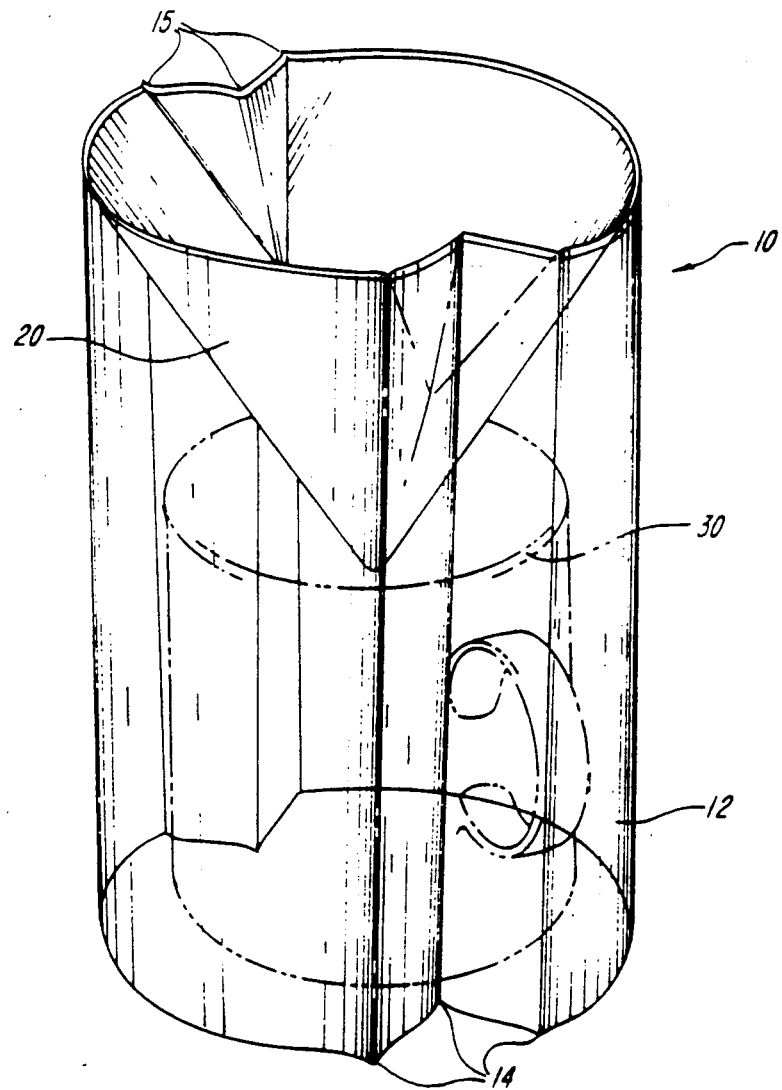
FIG. 2 is a perspective view of a first embodiment of the present invention in its expanded configuration relative to a coffee cup.
Figure 3:
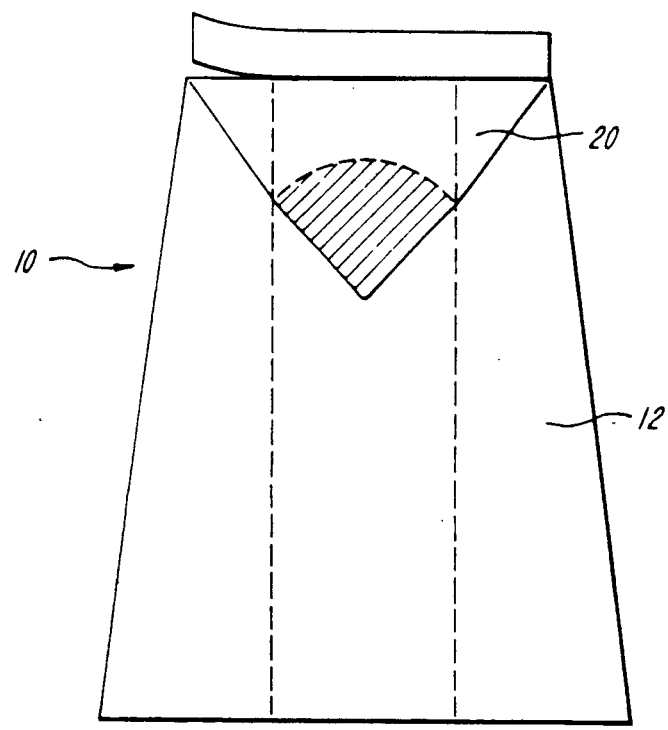
FIG. 3 is a front view of a first embodiment of the present invention having a wide base tapering to a more narrow dimension at the filter element.

It can be seen from FIGS. 1 and 2 that the housing 12 is a collapsable and expandable body which can be collapsed to form a substantially flat parcel, as shown in FIG. 1, and expanded to form a substantially tubular support structure, as shown in FIG. 2. Housing 12 is fabricated from a plyable, yet substantially rigid material, such as paper board or polymer film, which can facilitate this collapsable and expandable feature of the invention while providing sufficient rigidity to support a filter and at least one cup of liquid poured therethrough.

Figure 5:
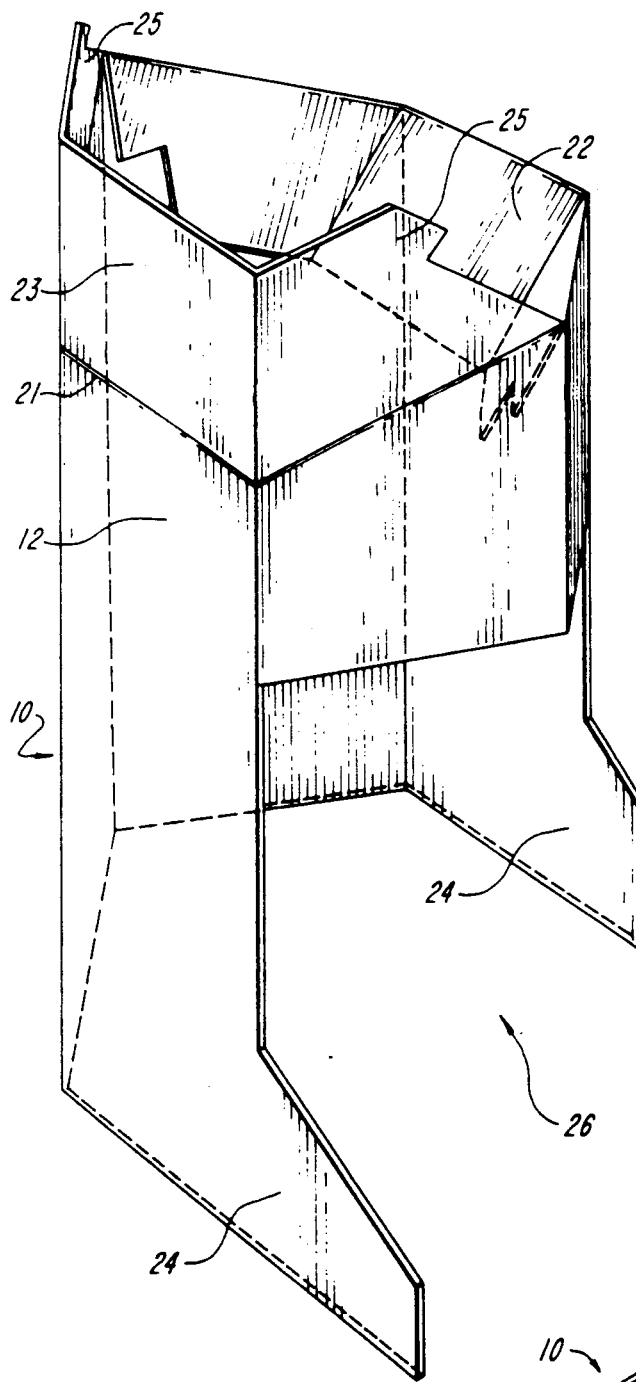
FIG. 5 is a perspective view of a second embodiment of the present invention showing the housing being expanded for use.
Figure 6:
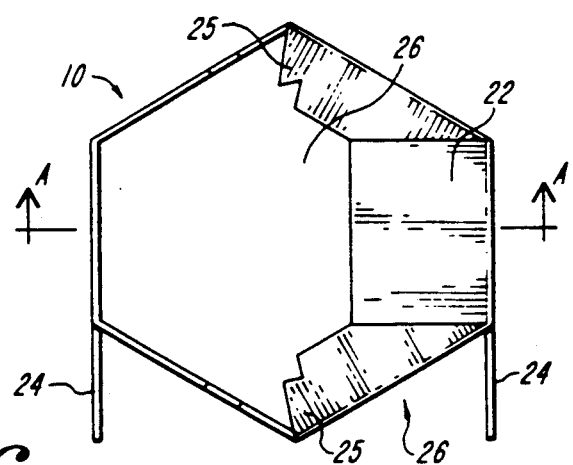
FIG. 6 is a top view of the second embodiment of the present invention showing the coffee-brewing apparatus in its expanded configuration.
Figure 7:
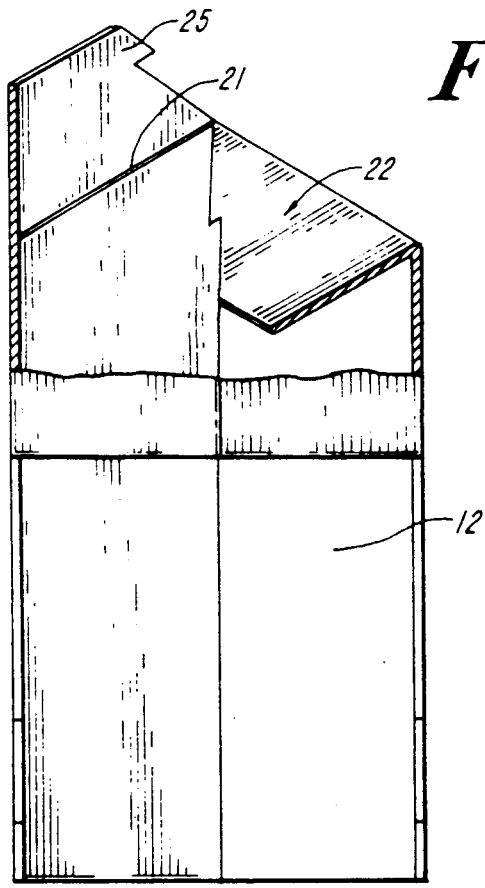
FIG. 7 is a cross-sectional view across section line A—A of FIG. 6.

The housing 12 is further provided with two sets of longitudinal creases 14 for collapsing the housing 12 thereabout, thereby forming gussets 13 along the peripheral edges of the collapsed housing, as shown in FIG. 1. Longitudinal creases 14 provide a dual function by providing additional structural support to the expanded housing 12 as can be seen in FIG. 2. For additional structural support, the housing 12, can be shaped in the form of a truncated cone as shown in FIG. 5, wherein the peripheral dimension of the housing at the base thereof is greater than the peripheral dimension at the filter element opening.

The housing 12 formed in accordance with the present invention is provided with a funnel shaped filter element 20 for support thereon. Filter element 20, is comprised of a typical filter material approved by the Food and Drug Administration, as for example, the Berkshire heat sealed long fiber papers manufactured by Kimberly-Clark Corporation or the Melita Standard Filter Paper No. 2. The filter element 20 is open around the periphery of the housing 20 tapering in a funnel like manner to a point substantially in the center of the housing 12. The filter element 20 can optionally be affixed to the housing around a peripheral edge thereof using a non-toxic, water resistant adhesive. Filter element 20 is also provided with two sets of filter creases 15 corresponding with the longitudinal creases 14 of housing 12 for interfitting therewith when the apparatus is in its closed configuration.

Figure 4:
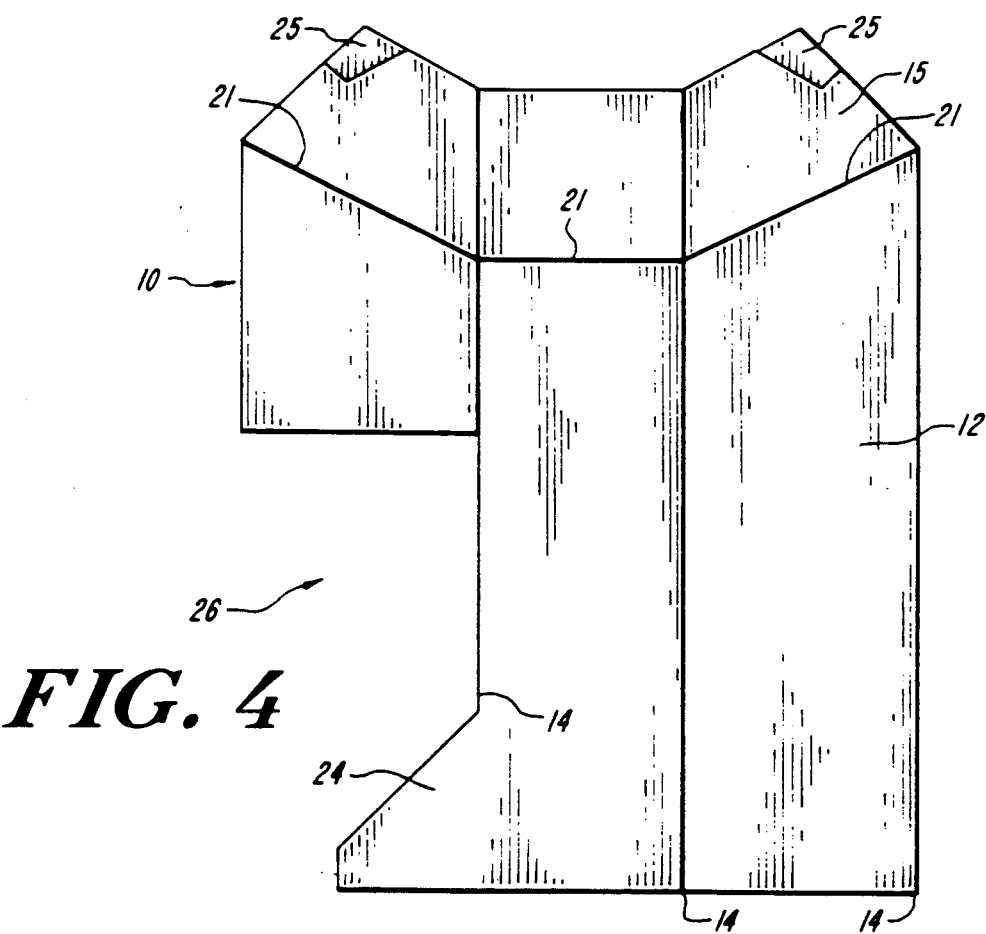
FIG. 4 is a front view of a second embodiment of the present invention in its collapsed configuration.

The coffee-brewing apparatus 10 of the present invention is prepared for use by simply squeezing inward against creases 14 of housing 12 to form a tubular cylinder as shown in FIG. 4. The expanded coffee-brewing apparatus 10 is then placed around a coffee cup or other drinking receptacle 30 such that the filter element 20 is positioned directly over the drinking receptacle 30 and the housing 12 surrounds the coffee cup 30 supported on a counter, table or other support surface thereof. It should be appreciated that the housing 12/filter element 20 arrangement is preferrably of a diameter and height to accommodate a large range of various drinking receptacle sizes. It will also be appreciated that the housing 12 of this embodiment is preferably made of a transparent or opaque material to allow the user to see the coffee making operation and resultant coffee beverage.

A second embodiment of the present invention is shown in FIGS. 4–7 wherein the housing 12 includes a self-contained filter basket 22 for receiving a filter element 20 and providing support thereto. In addition, this second embodiment further includes a pair of projecting legs 24 for providing additional stability to the apparatus as well as a peripheral opening 26 for placing and removing a drinking receptacle 30 from within the housing 12.

As best shown in FIG. 4, the housing of this second embodiment comprises a plurality of interspaced longitudinal creases 14 interconnected by lateral creases 21. The housing 12 is expanded about the interspaced longitudinal creases 14 such that, in its expanded configuration, the housing 12 comprises a plurality of segments defining a geometric shape, as for example the hexagonal contour of FIG. 5.

Lateral creases 21 demarcate a fold line for forming flaps 23 wherein flaps 23 are folded inward about the lateral creases 21 to form the filter basket 22. Tabs 25 are disposed along opposing free edges of flaps 23 to provide an overlapping relationship between each flap 23 along the confronting free edges thereof. This overlapping relationship locks each flap 23 into position, bearing against one another and pushing outwardly on the housing 12. The resultant filter basket 22 further includes an opening 26 such that the filter basket 22 provides a spout through which water can drain. It will be appreciated that the geometric shape of the housing 12 of this second embodiment provides inherent structural support for the coffee-brewing apparatus 10 and that additional structural support is further provided by the outward force exerted by the interlocking flaps 15 which make up the filter basket 22.

The housing 12 of this second embodiment further includes a peripheral opening 26 for placing and removing a drinking receptacle 30. As best shown in FIG. 4, the peripheral opening 26 is formed by removing a segment of the housing 12 intermediate thereto. The opening 26 thus formed is delimited by a pair of projecting legs 24 opposite the filter basket 22 of the housing 12. The expanded housing 12 thus formed is provided with an opening 26 for placing and removing a drinking receptacle 30 from within the housing 12 such that protruding legs 24 substantially surround the drinking receptacle 30 and provide an enlarged support base for the coffee-brewing apparatus 10.

Figure 9:
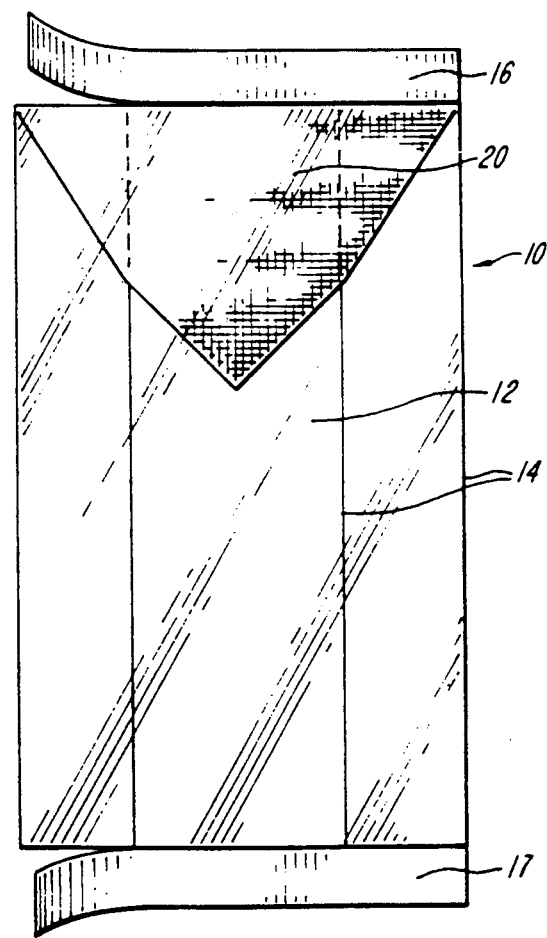
FIG. 9 is a front view of a first embodiment of the present invention having detachable seals adjacent to the filter element and to the base thereof.
Figure 8:
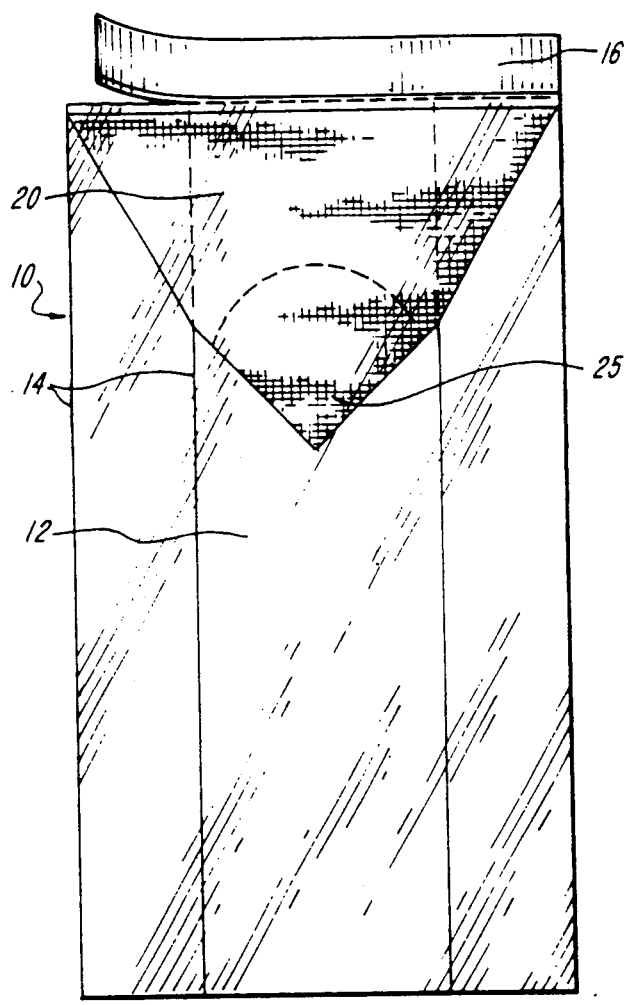
FIG. 8 is a front view of a first embodiment of the present invention having a single detachable seal adjacent to the filter element thereof.
Figure 10:
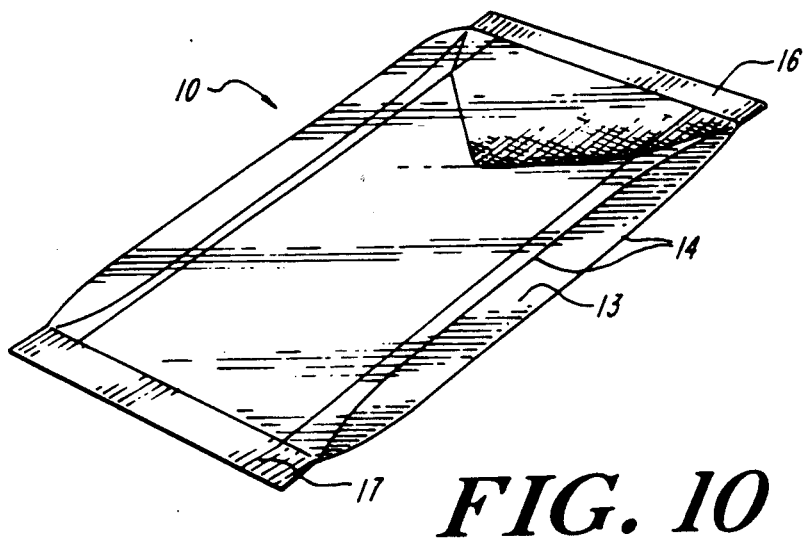
FIG. 10 is a perspective view of a first embodiment of the present invention having detachable seals adjacent to either end of the housing to make up its packaged form.
Figure 11:
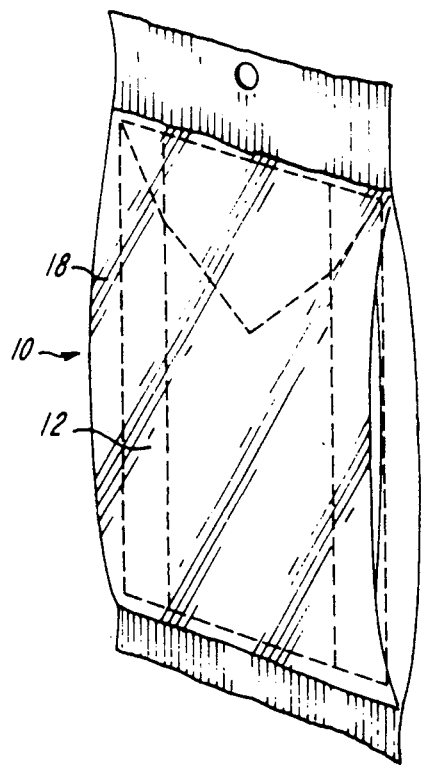
FIG. 11 is a perspective view of a first embodiment of the present invention in which the invention is sealed within a separate packaging envelope.
Figure 13:
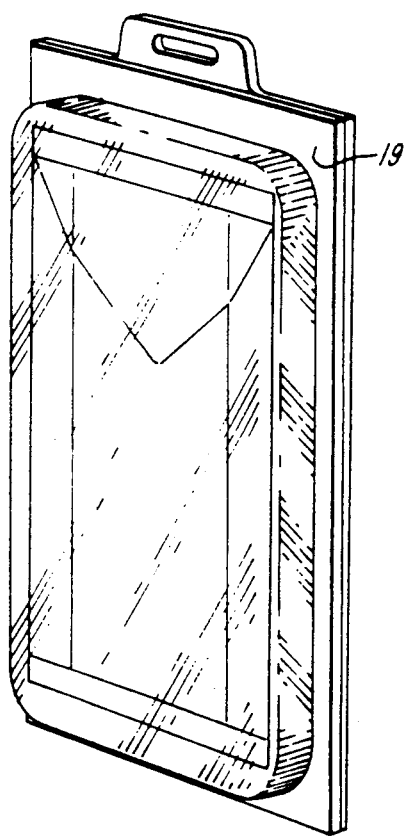
FIGS. 12 and 13 are respectively open and closed perspective views of a first embodiment of the present invention wherein a plurality of coffee-making apparatus are separately packaged within a display package.
Figure 12:
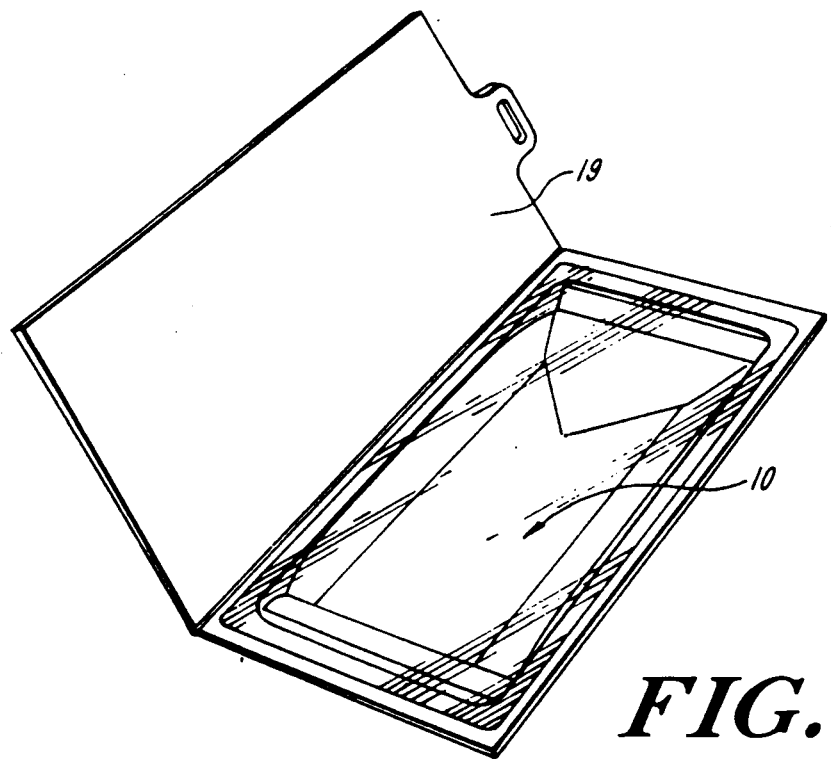

The collapsable housing 12 of the present invention permits various packaging alternatives as shown in FIGS. 8–13 with respect to the first embodiment of the coffee-brewing apparatus 10 described herein. As shown in FIG. 8, the collapsed housing 12 can be provided with a detachable seal 16 adjacent to the filter opening. In addition, the collapsed housing can be provided with a second detachable seal 17 opposite the filter opening such that the entire coffee-brewing apparatus 10 can be packaged as a self-contained apparatus as shown in FIGS. 9 and 10. As another option, the coffee-brewing apparatus 10 of the present invention can be packaged in a separately sealed outer envelope 18 as shown in FIG. 11. Finally, FIGS. 12 and 13 illustrate a display package 19 in which several disposable coffee-brewing apparatus 10 can be packaged and marketed for sale at, for example, a point of sale display. Each of these separate packaging configurations provide a convenient means for storage and display while further providing a means to maintain coffee freshness.

It should be further appreciated that various changes may be made in the coffee-brewing apparatus as set forth in the present application. It should be understood that all matter herein described or shown in the accompanying drawings is to be interpreted as illustrative only and is not to limit the invention.

What is claimed is:

1. A disposable coffee-brewing apparatus for placement over a drinking receptacle, comprising:

an expandable and collapsible housing and a filter element for support thereon, said housing including:

a plurality of interspaced longitudinal creases for collapsing and expanding said housing thereabout, forming a flat parcel in its collapsed configuration and an open-ended tubular structure having a base end and a top end in its expanded configuration; and a plurality of lateral creases, each lateral crease extending between each adjacent longitudinal crease and forming at least two flaps adjacent to said top end of said housing, wherein each said flap is folded inwardly toward one another to form a filter basket for receiving said filter element;

said housing being configured and dimensioned such that said apparatus surrounds or substantially surrounds said drinking receptacle when said drinking receptacle and said housing are both positioned on a surface supporting both said drinking receptacle and said housing;

said inwardly folded flaps and said remainder of said top end being configured and dimensioned to both support said filter element and an associated measure of coffee and hot water above said drinking receptacle and also define an opening in said top end such that said filter basket provides a spout through which said water can drain when said filter element is supported thereon;

said housing further including an opening for placing and removing said drinking receptacle positioned therein.

2. The disposable coffee-brewing apparatus of claim 1 wherein said at least two flaps further include projecting tabs disposed along opposite free edges thereof, wherein each said tab overlaps an adjacent flap when folded toward one another to form a latching relationship therebetween.

3. The disposable coffee-brewing apparatus of claim 1, wherein said housing includes a pair of support legs projecting from opposite edges of said opening adjacent to said base end for providing additional support thereto.

4. The disposable coffee-brewing apparatus of claim 1, the peripheral dimension of said housing at said base end is greater than the peripheral dimension at said top end, for providing additional stability to said housing.

5. The disposable coffee-brewing apparatus of claim 1, wherein said expandable and collapsable housing comprises a flexible paperboard material.

6. The disposable coffee-brewing apparatus of claim 1, wherein said expandable and collapsable housing comprises a flexible polymer material.

7. The disposable coffee-brewing apparatus of claim 1, wherein said housing is made of a metalized polymer material to increase the thermal efficiency thereof.

8. The disposable coffee-brewing apparatus of claim 1, wherein said filter element is provided with said measure of ground coffee suitable for making a single serving of coffee.

9. The disposable coffee-brewing apparatus of claim 1, wherein said filter element is affixed to a peripheral edge of said filter basket.

10. The disposable coffee-brewing apparatus of claim 9, wherein said housing, in its collapsed configuration, further includes a detachable seal adjacent to said affixed filter end.

11. The disposable coffee-brewing apparatus of claim 10, wherein said housing, in its collapsed configuration further includes a detachable seal adjacent to the end opposite said affixed filter end.

12. The disposable coffee-brewing apparatus of claim 10, further comprising a separate packaging envelope for sealing said apparatus therein.

* * * * *

UNITED STATES PATENT AND TRADEMARK OFFICE
CERTIFICATE OF CORRECTION

PATENT NO. : 5,055,311

DATED : October 8, 1991

INVENTOR(S) : Walter H. Brauer, Jr., et al.

It is certified that error appears in the above-identified patent and that said Letters Patent is hereby corrected as shown below:

On the title page after the identification line,
[73] Assignee:, "Walter H. Braier, Jr." should read
--Walter H. Brauer, Jr.--.

Signed and Sealed this

Twenty-sixth Day of October, 1993

Attest:

BRUCE LEHMAN

Attesting Officer     Commissioner of Patents and Trademarks